US010601867B2

United States Patent
Kokubu

(10) Patent No.: US 10,601,867 B2
(45) Date of Patent: Mar. 24, 2020

(54) ATTACK CONTENT ANALYSIS PROGRAM, ATTACK CONTENT ANALYSIS METHOD, AND ATTACK CONTENT ANALYSIS APPARATUS

(71) Applicant: FUJITSU LIMITED, Kawasaki-shi, Kanagawa (JP)

(72) Inventor: Hiroyuki Kokubu, Inagi (JP)

(73) Assignee: FUJITSU LIMITED, Kawasaki (JP)

(*) Notice: Subject to any disclaimer, the term of this patent is extended or adjusted under 35 U.S.C. 154(b) by 325 days.

(21) Appl. No.: 15/607,808

(22) Filed: May 30, 2017

(65) Prior Publication Data

US 2017/0374099 A1 Dec. 28, 2017

(30) Foreign Application Priority Data

Jun. 23, 2016 (JP) ................................. 2016-124825

(51) Int. Cl.
*H04L 29/06* (2006.01)
*G06F 21/53* (2013.01)
*G06F 21/56* (2013.01)

(52) U.S. Cl.
CPC .......... *H04L 63/1491* (2013.01); *G06F 21/53* (2013.01); *G06F 21/562* (2013.01); *H04L 63/1416* (2013.01); *H04L 63/1441* (2013.01)

(58) Field of Classification Search
CPC ............. H04L 63/1491; H04L 63/1416; H04L 63/1441; G06F 21/53; G06F 21/562
See application file for complete search history.

(56) References Cited

U.S. PATENT DOCUMENTS

| 7,945,642 B1* | 5/2011 | Hung ........................ G06F 8/61 709/219 |
| 2017/0134405 A1* | 5/2017 | Ahmadzadeh ...... H04L 63/1416 |
| 2017/0163664 A1* | 6/2017 | Nagalla .................. H04L 63/10 |

FOREIGN PATENT DOCUMENTS

JP 2012-64208 3/2012

* cited by examiner

*Primary Examiner* — Ayoub Alata
(74) *Attorney, Agent, or Firm* — Fujitsu Patent Center

(57) ABSTRACT

An attack content analysis program causing a computer to execute a process including, receiving transmit data including a first program and transmitted, through a second network, to a first machine connected to a first network, transmitting, after initiation of the first program, a read-based instruction for the first machine via a first session established between the computer and a second machine, which is different from the first machine; and executing, after initiation of the first program, a write-based instruction for the first machine on behalf of the first machine.

13 Claims, 14 Drawing Sheets

ATTACK CONTENT ANALYSIS PROGRAM, ATTACK CONTENT ANALYSIS METHOD, AND ATTACK CONTENT ANALYSIS APPARATUS

CROSS-REFERENCE TO RELATED APPLICATION

This application is based upon and claims the benefit of priority of the prior Japanese Patent Application No. 2016-124825, filed on Jun. 23, 2016, the entire contents of which are incorporated herein by reference.

FIELD

The present invention relates to an attack content analysis program, an attack content analysis method, and an attack content analysis apparatus.

BACKGROUND

Cyber attack based on transmission of targeted mails, navigation to bogus sites, or the like has been a social problem. Targeted cyber attack is based on, for example, the following process. First, in an initial stage, an illicit program is transmitted to an attack target machine via transmission of targeted mails, access to a website with the illicit program embedded therein (drive-by download), or the like. The attack target machine is then forced to initiate and execute the illicit program before an attack target user knows the attack. The targeted cyber attack is composed of advanced persistent threat (APT) in which a plurality of instructions is forced to be executed in a step-by-step manner and mainly includes execution of an information collection instruction, setup of an illicit remote session between an attacker machine and the attack target machine, and downloading of collected information via the remote session, which are included in the initial stage, and searches for various types of information and execution of illicit instructions in the infected machine, utilizing the remote session.

As a measure against the cyber attack based on transmission of targeted mails or navigation to bogus sites, a sandbox has been proposed in order to prevent the attack target machine from executing illicit programs or malware or to identify such execution. The sandbox is an isolated environment for security in which a virtual machine isolated from an operating environment of the attack target machine executes an illicit program to allow illicit behavior to be monitored and analyzed.

An example of the sandbox is described in Japanese Laid-open Patent Publication No. 2012-64208.

SUMMARY

However, the attacker may find that the illicit program is not being executed by the attack target machine but by a sandbox or a security apparatus that takes measures comparable to the measures taken by the sandbox through searches for relatively easily acquired information such as profile information on the target machine attacked by the illicit program (physical information on the machine, the host name and IP address of the machine, and the like), screen shots of a desktop of the attack target machine obtained while the attack target machine is in operation, a machine environment used by the attack target user (applications being executed and execution logs), and network configuration information, and suspend the subsequent attack procedure at the initial stage of the attack.

As a result, the sandbox can achieve an object to avoid possible damage done by the attack but fails to accomplish an object to allow the illicit program to be executed in the sandbox to capture and utilize the behavior and operation of the illicit program to prevent the cyber attack.

An aspect of an embodiment is a non-transitory computer-readable storage medium storing therein an attack content analysis program that causes a computer to execute a process including, receiving transmit data including a first program and transmitted, through a second network, to a first machine connected to a first network, transmitting, after initiation of the first program, a read-based instruction for the first machine via a first session established between the computer and a second machine, which is different from the first machine; and executing, after initiation of the first program, a write-based instruction for the first machine on behalf of the first machine.

The first aspect allows the presence of a security apparatus to be made unlikely to be sensed by an attacker intruding through the network.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
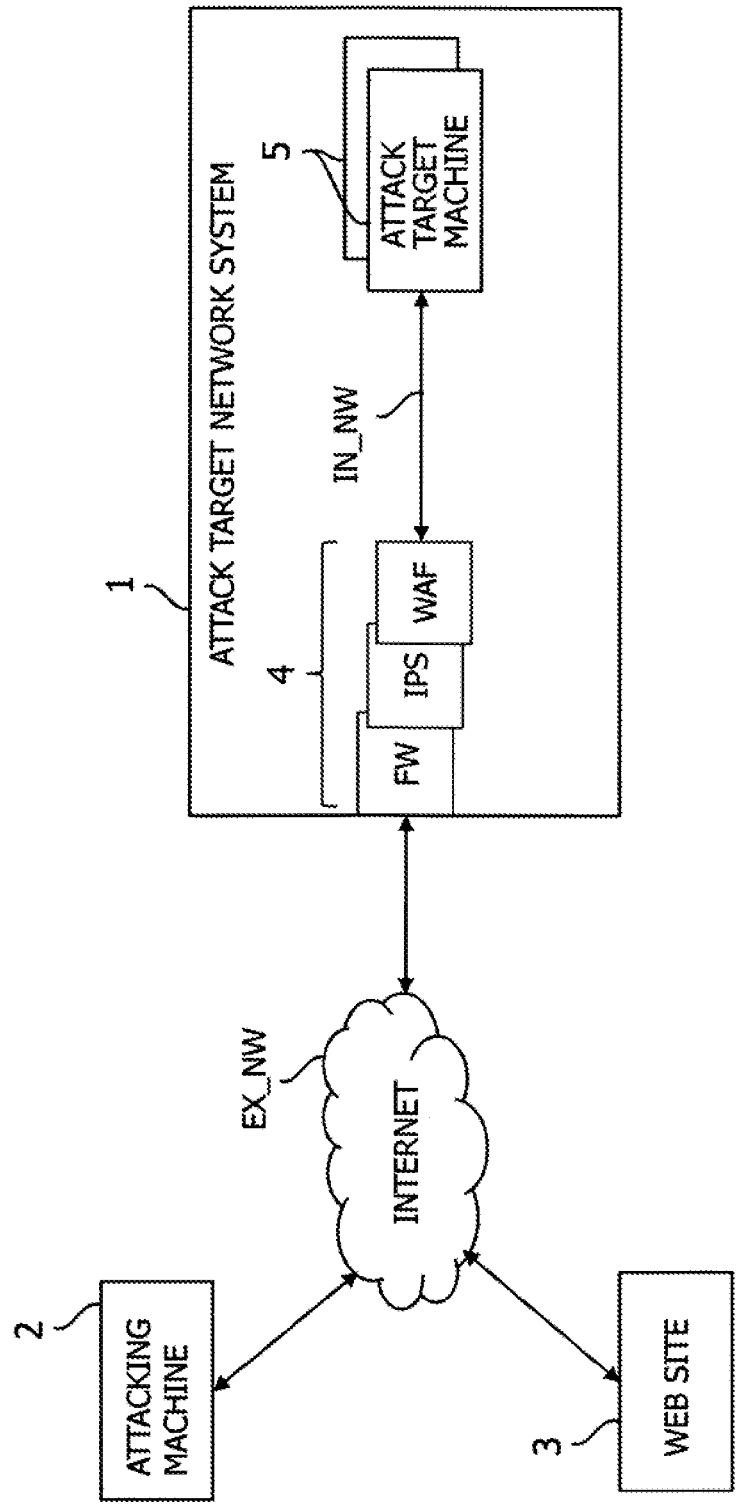
FIG. 1 is a diagram generally illustrating targeted cyber attack.

FIG. 1 is a diagram generally illustrating targeted cyber attack. An attack target network system 1 is a network system in a certain organization such as a company or a public office. The attack target network system 1 includes an internal network IN_NET having a plurality of first machines (attack target machines) 5 that could be attack targets. At a boundary between the internal network IN_NET in the attack target network system 1 and an external network EX_NET, security apparatuses 4 such as a firewall FW, an intrusion prevention system IPS, and a web application firewall WAF are installed to provide a configuration that interrupts unneeded or illicit communication through the external network.

The attack target machine 5 is a personal computer, a server or the like operated for routine work by people and for which installed software includes platform software such as an operating system (OS), common tools such as a web browser and a mail program, and application programs adapted for the respective operations. For business reasons, the attack target machine 5 could be authorized to access a server or a storage apparatus (not depicted in the drawings) that stores confidential data such as business information and client information in the internal network IN_NET or could not be authorized to access such confidential data.

The external network EX_NET is provided with, in addition to common web sites 3, a malicious second machine (attacking machine) 2 that attempts a targeted cyber attack or APT. As described below, the attacking machine 2 starts an attack by, for example, transmitting a targeted attack mail with an attached illicit program to an internal machine in the attack target organization, that is, the attack target machine 5, and subsequently while persistently repeating such attacks, launches external exposure of confidential information or corruption of the information, which is the final purpose of the attacker.

Figure 2:
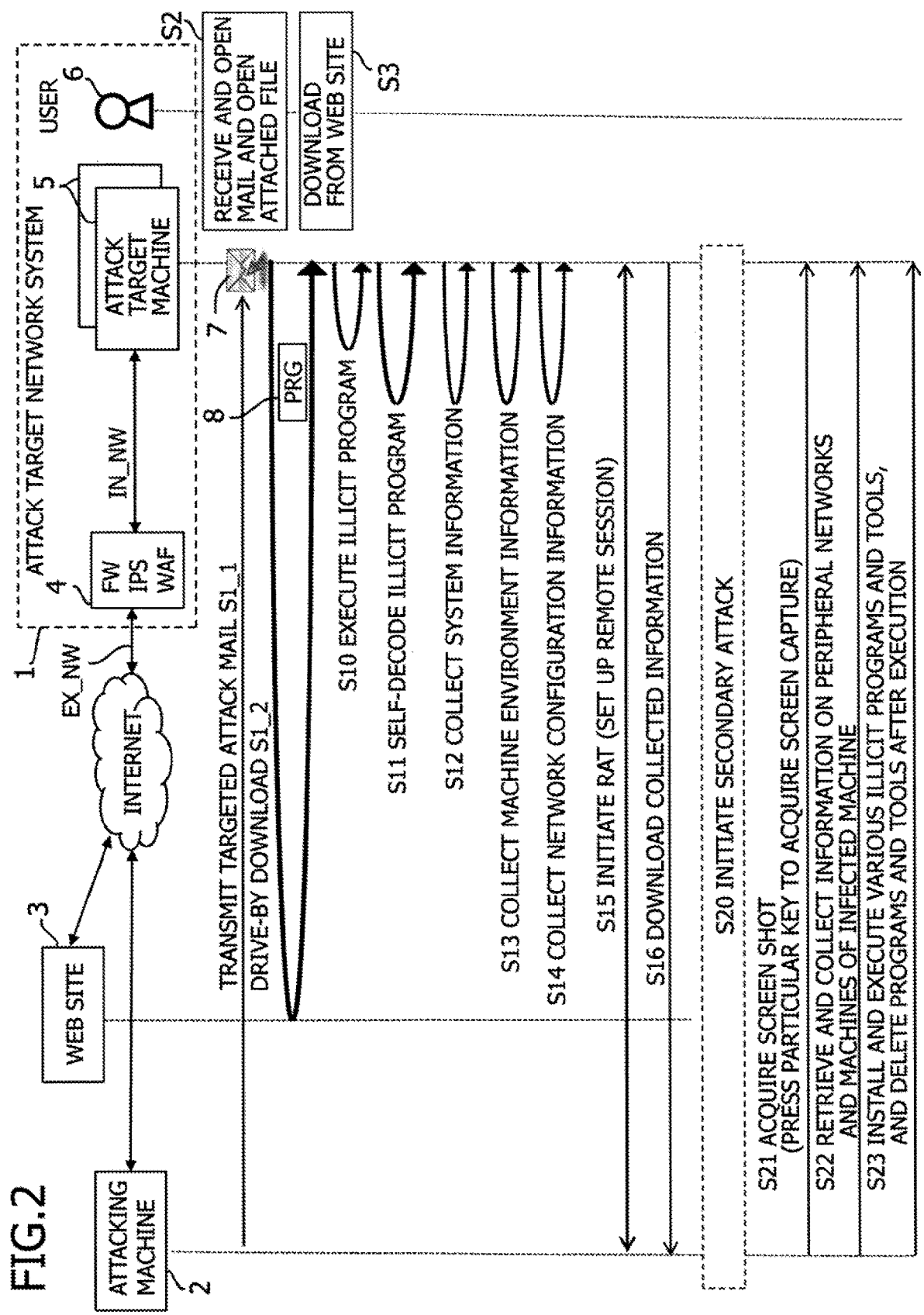
FIG. 2 is a diagram illustrating an example of a targeted cyber attack.

FIG. 2 is a diagram illustrating an example of a targeted cyber attack. The organization provided with the attack target network system 1 is assumed to have the security apparatuses 4 such as FW, IPS, and WAF installed at the boundary between the attack target network system 1 and the external network EX_NW. However, the security apparatuses 4 are based on a sensing scheme in which permission and blockage of communication are automatically ruled for each type of communication and in which character strings for communication referred to as signatures are identified via pattern matching. Therefore, the security apparatuses 4 have difficulty determining whether or not the communication is a targeted attack through monitoring data communication according to web communication (http communication) or mail communication (SMTP communication) permitted between the attack target network system 1 and the Internet as represented by the external network EX_NET i.e. internet.

On the other hand, the attacker operating the attacking machine 2 intrudes into the internal network IN_NW in the network system 1 in the organization and attempts a targeted cyber attack aimed to wrest internal confidential information. A public web site 3 of an organization different from the organization using the network system 1 is assumed to be weak, and thus, the attacking machine 2 is assumed to alter a download page for public information in the web site 3 to plant, in the page, an illicit program that sets up illicit communication with the attack target network system when the page is accessed. In another case, the attacking machine 2 is assumed to transmit a targeted mail to the attack target machine 5. The targeted mail includes a false attached file including an illicit program that is similar to the above-described illicit program and that fails to be recognized by the user.

In FIG. 2, for example, the attacking machine 2 transmits a targeted attack mail 7 to the attack target machine 5 (S1_1). The targeted attack mail 7 is apparently similar to mails usually received by the user of the attack target machine 5 and fails to be sensed by the security apparatuses 4. The targeted attack mail 7 is received by a mail program in the attack target machine 5 via the internal network IN_NET in the attack target network system 1. The user 6 receives the targeted attack mail 7 and performs an operation of opening an attached file such as PDF document attached to or included in the mail (S2). The operation of opening the attached file allows the PDF document file to be displayed on the attack target machine 5. When the PDF document file is read by the user 6, an illicit program such as an active script is initiated and executed in a background (S10).

In FIG. 2, in another example, the attack target machine 5 web-accesses (through http or https communication) the web site 3 with the illicit program embedded therein, downloads data containing the illicit program 8, and stores the illicit program in the attack target machine 5 (S1_2). Consequently, the attack target machine 5 is infected with the illicit program 8. Then, the illicit program is initiated in the background. Normally, the illicit program is encrypted and thus fails to be recognized by sensing programs in the security apparatuses 4 provided on a network path.

When infection results from reception of the targeted attack mail (S1_1) or from drive-by download (S1_2) as described above, an execution file for the illicit program is initiated (S10). When the embedded illicit program is executed, for example, self-decoding of the program is initiated (S11). The decoded illicit program executes, for example, the following instructions.

First, the illicit program executes several types of commands to reference and collect system information on the attack target machine 5 (for example, sysinfo commands for Windows (registered trade mark)) and stores the referenced system information in a particular drive area or storage area in the attack target machine (S12). Then, the illicit program executes a command to reference and collect machine environment information such as detailed system environment and operation settings for the attack target machine 5 (for example, a reg query command for Windows) and stores the referenced machine environment information in the same particular drive area (S13). The illicit program further executes commands to reference and collect needed information in network configuration files for the attack target machine and information for various communication paths (for example, an ipconfig command and a netstat command for Windows) and stores the information from the referenced network configuration file and the like in the same particular drive area (S14).

Execution of the above-described reference-based instructions, in other words, the read-based instructions, allows various pieces of information on the attack target machine 5 to be stored in the particular drive area in the attack target machine 5.

The illicit program references the collected information and starts a remote administration tool RAT that sets up a remote session with the attacking machine 2 to construct a remote session between the attacking machine 2 and the attack target machine 5 (S15). Execution of the RAT needs the system information and machine environment information, IP address and URI information contained in the network configuration file, and the like of the attack target machine.

Subsequently, the illicit program downloads the information stored in the particular drive area in the attack target machine into the attacking machine 2 via the constructed remote session (S16). The attacking machine 2 may wait for setup of the remote session with the attack target machine and connection of remote communication resulting from the commands executed in association with the infection with the illicit program. When downloading of the collected information (S16) succeeds, the attacker operating the attacking machine 2 recognizes that the attack target machine has been infected with the illicit program and thus made remotely controllable.

When an initial stage from steps S1 to S16 is completed, the attacking machine 2 utilizes the collected information and the constructed remote session to start a secondary attack that attempt to search for various types of information in the attack target network system and control the attack target machine (S20).

In the secondary attack, for example, the attacking machine 2 executes a remote desktop function utilizing remote sessions to, for example, operate a particular key that captures a screen of a keyboard of the attack target machine, thus acquiring a screen shot of the attack target machine (a copy of the desktop) (S21). Acquisition of a screen shot may be performed a plurality of times at time intervals. The attacker can determine, for instance, whether or not the affected attack target machine 5 is a common server based on the acquired screen shots. A screen shot of a common server appears not to be used by a person and does not vary over time and can thus be distinguished from the attack target machine operated for routine work by a person.

Based on the information acquired in the initial stage, the attacker can also check what applications are installed in the attack target machine, thereby determine whether or not the attack target machine 5 is a common server, and presumably determine a section to which the attack target machine belongs.

In the secondary attack, the attacking machine 2 attempts to retrieve and collect network information on the periphery of the infected attack target machine 5 or information on peripheral machines (S22). This processing is executed by the attacking machine 2 using network retrieval commands such as ping, arp, and dnsllookup. This may enable acquisition of network segments of a server in which confidential information is stored, the IP address of the server, and the like.

Based on the collected information, the attacking machine 2 installs and executes various new illicit programs and tools in the attack target machine or the peripheral machine to download or corrupt target confidential information (S23). In the targeted cyber attack, the confidential information as the final target is searched for by repeating collection of information, identification of a new attack target machine based on the collected information, and installation and execution of a new illicit program many times.

When the target confidential information is acquired or corrupted, the installed illicit programs and tools are removed by the attacking machine 2 (S23).

[Sandbox]

As a method for preventing confidential information from being exposed by execution of an illicit program with which the attack target machine is infected as a result of a targeted cyber attack, provision of a machine or a system referred to as a sandbox (hereinafter "sandbox system") has been proposed which operates in an isolated area.

The sandbox system operates an illicit program received from an external network in an area isolated from other machines and storage areas in the internal network to prevent the illicit program executed by the sandbox machine from operating the attack target machine and the like in the internal network. Therefore, externally intruding malicious viruses (illicit programs) can be prevented from affecting confidential information and the like located outside the isolated area.

The sandbox system enables determination of whether or not illicit processing is executed by an external malicious attacker by detecting malware (computer viruses such as illicit programs), or checking execution of decipher and cipher processing for an illicit program, activation of a communication process or the processing contents of the communication process. Once the operation is determined to be illicit, the communication process to the attack target machine and the like in the internal network is confined and quarantined a in an isolated area. This prevented the attack target machine in the internal network from being affected.

The sandbox system also has a function to emulate initiation and execution of an illicit program in the attack target machine to capture the contents of a new type of attacking technique and processing involved in the technique. This function enables a new measure against the targeted cyber attack to be developed based on the captured contents of the new type of attacking technique and the captured processing involved in the technique.

Figure 3:
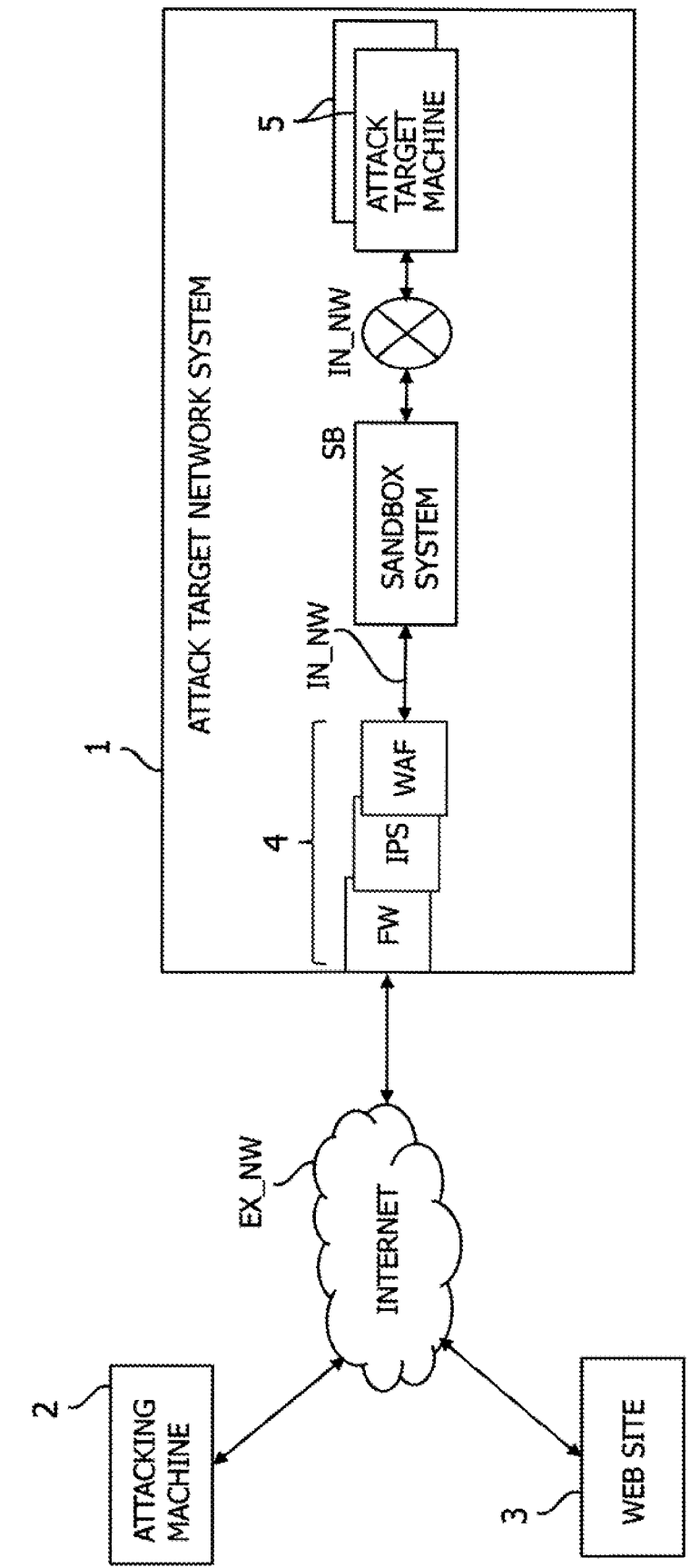
FIG. 3 is a diagram illustrating a configuration example of an attack target network system having a sandbox system.

FIG. 3 is a diagram illustrating a configuration example of an attack target network system having a sandbox system. Unlike the configuration of the attack target network system 1 illustrated in FIG. 1, the configuration example in FIG. 3 includes a sandbox system SB provided on the internal network IN_NET between the attack target machine 5 and the security apparatuses 4 connected to the external network EX_NET. The sandbox system SB is provided in an area isolated from machines, servers, and storages in the attack target network system 1. For example, the sandbox system is configured by a physical machine different from the internal machine and server. Alternatively, the sandbox system is configured by a virtual machine different from the internal machine.

The sandbox system SB receives and stores a received mail transmitted through the external network having successfully passed through the security apparatuses 4 or drive-by-downloaded data on behalf of the attack target machine to which the mail is destined or into which the data is downloaded. The sandbox system SB then emulates execution of a program included in the received mail or the downloaded data (at this point in time, whether or not the program is illicit is unknown). Since the sandbox system is provided in the isolated area, even when the sandbox system executes an illicit program, the attack target machine 5 and other storages are prevented from being affected. When the executed program is determined to be illicit, the sandbox system prevents the attack target machine in the internal network from being affected by the illicit program.

The sandbox system checks the received mail or the downloaded data by referring to a white list containing source domains and IP addresses previously determined not to be involved with an illicit program. Upon being determined to match any object in the white list, the received mail or the downloaded data may be transferred to the attack target machine in the internal network. When the received mail or the downloaded data is determined not to match any object in the white list, the sandbox system stores the mail or data and executes a program included in the mail or data on behalf of the attack target machine.

Figure 4:
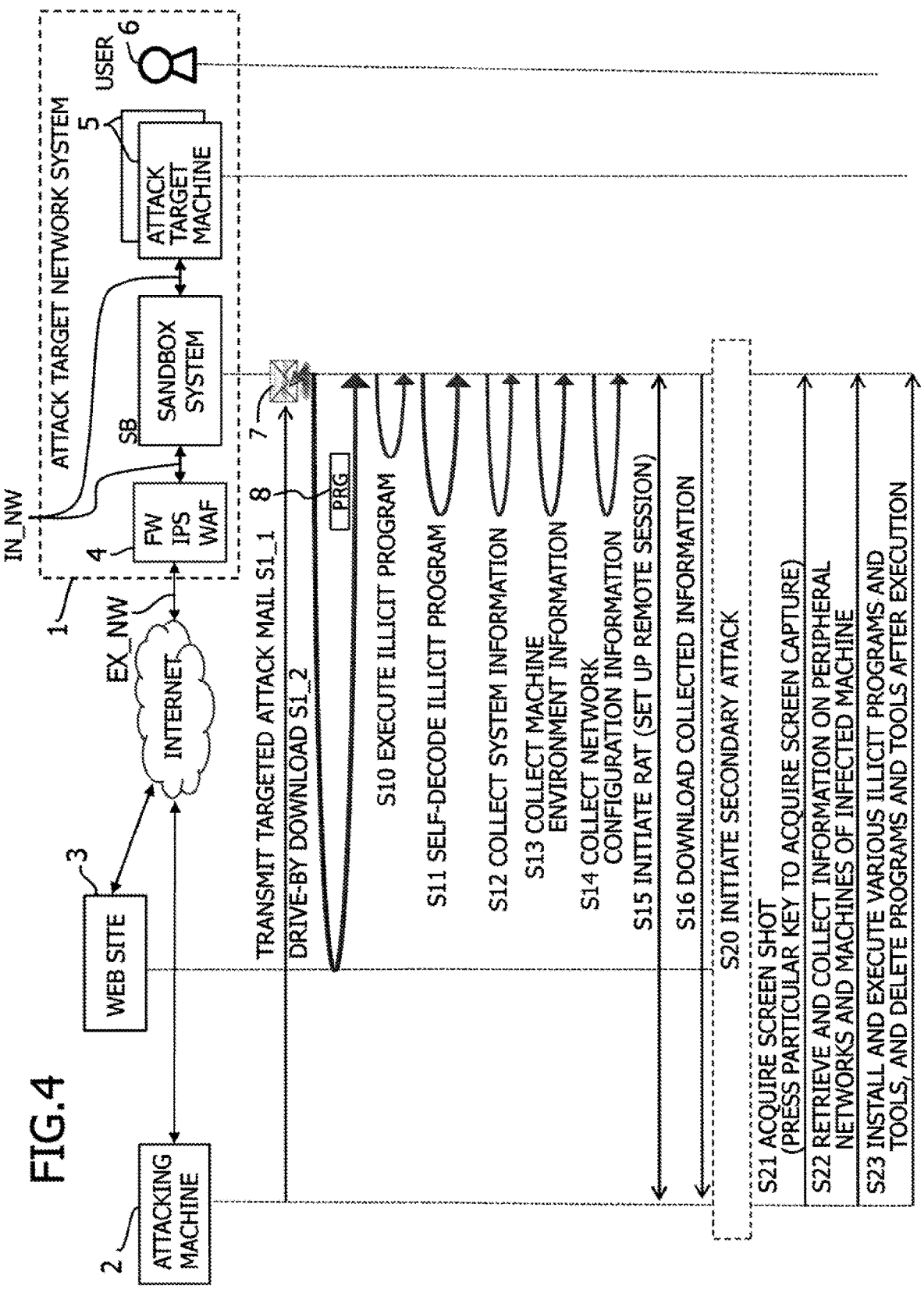
FIG. 4 is a diagram illustrating an example of a targeted cyber attack on the attack target network system provided with the sandbox system.

FIG. 4 is a diagram illustrating an example of a targeted cyber attack on the attack target network system provided with the sandbox system. The preconditions described for FIG. 2 are also applied to FIG. 4. The procedure of the targeted cyber attack is similar to the procedure in the example in FIG. 2.

In FIG. 4, a trigger to a targeted cyber attack is also reception of the targeted attack mail 7 having an attached illicit program or containing the illicit program (S1_1) or reception of downloaded data containing the illicit program 8 in response to access to the Web site by the attack target machine 5 (S1_2).

The sandbox system SB is provided on a path between the external network EX_NET and the attack target machine 5 and thus receives the received mail or the downloaded data on behalf of the attack target machine. Thus, the sandbox system automatically performs opening of the received mail or checking (opening) of the included file, which is, in the attack target machine 5, manually executed by the user 6. Alternatively, the sandbox system automatically stores the downloaded data.

In the sandbox system, in response to reading of the attached file in the received mail or storing of the downloaded data, the illicit program is initiated and executed in the background (S10). Subsequently, the sandbox system SB performs self-decoding of the illicit program (S11), execution of a command to collect system information (S12), execution of a command to collect machine environment information (S13), and execution of a command to collect network configuration information (S14), in accordance with the illicit program, and stores the collected information in a particular drive area or storage in the sandbox system.

The sandbox system further invokes a remote administration tool (RAT) to construct (set up) a remote session between the sandbox system and the attacking machine 2 in accordance with the illicit program (S15). The sandbox system then downloads to the attacking machine 2 the system information, machine environment information, and network configuration information collected in steps S12 to S14, via the remote session in accordance with the illicit program (S16).

In the subsequent secondary attack S20, the attacking machine 2 performs acquisition of a screen shot that is a copy of the desktop of the machine (S21), retrieval and collection of information on peripheral networks and machines of the infected sandbox system (S22), and installation of various illicit programs and tools in the sandbox system, execution of the programs and tools, and deletion of the programs and tools after execution (S23) as is the case with FIG. 2.

Then, the attacking machine 2 attempts to determine whether or not any sandbox system is present in the attack target network system 1 based on the collected information and the like. For example, upon finding that the target machine has a virtualization program (hypervisor) based on the system information collected in steps S12, S16, the attacker operating the attacking machine 2 estimates that the target machine is a sandbox and stops attacking operations in step S16 and the subsequent steps.

Alternatively, upon finding that the network configuration information collected in steps S13, S16 has no network configuration otherwise provided in business machines (attack target machines) operated for routine work by people (for example, information on a network segment to which the server in the internal network is connected and information on routing to the network segment), the attacker estimates that the target machine is a sandbox.

In the above-described example, the attacker notices the presence of the sandbox system based on the collected information downloaded in step S16, removes the malware (illicit program) with which the sandbox system is infected and information on the malware to obliterate the trace of the malware, and stops the subsequent attacking operations.

The attacker further acquires screen shots a plurality of times at time intervals (S21) to estimate that the machine infected with the illicit program is not the attack target machine but a sandbox system, which is normally not used by people, based on no trace of usage of the machine for operations or the like and no change in icons or the like in the desktop over time. In general, in servers such as sandbox systems and monitoring systems which are not directly operated by people, a small number of icons are arranged in order on the desktop screen and do not change over time.

As described above, the attacker may stop the subsequent attacking operations if the target machine is suspected or estimated to be a sandbox system instead of the attack target machine based on the information on the target machine and the screen shots collected by the attacking machine 2. As a result, the sandbox system can achieve an object to protect the attack target machine from the targeted cyber attack but fails to accomplish an object to capture the contents of a new type of attacking technique used by the attacker and processing involved in the technique.

[Sandbox System in the First Embodiment]

When an instruction involved in execution of an illicit program is a read-based instruction, a sandbox system in a first embodiment transmits the instruction to a victim machine or a decoy machine (hereinafter a victim machine) different from an attack target machine via a pre-constructed remote session. When the instruction is a write-based instruction, the sandbox system in the first embodiment executes the instruction in the sandbox system. Even in the secondary and subsequent attacks, the sandbox system transmits a read-based instruction from the attacking machine 2 to the victim machine via the remote session, and executes a write-based instruction from the attacking machine in the sandbox system. The victim machine is not the attack target machine but is a machine operated for routine work by a person.

The read-based instruction is an instruction without any change in internal information such as an instruction to reference system information or to acquire a screen shot. The write-based instruction is an instruction with a change in internal information such as an instruction to self-decode a program or to install a program.

As described with reference to FIG. 3, the sandbox is provided in an area isolated from other machines, servers, and storages in the attack target network system and is thus prevented from affecting the attack target machine or the like even when executing a write-based instruction. When a read-based instruction is transmitted to a victim machine, which then executes the instruction, the collected information includes system information and screen shots of the victim machine operated for routine work by a person. Like the attack target machine, the victim machine is used for routine work by a person, and thus, the collected information is similar to information collected from the attack target machine. This enables an increase in the possibility that the attacker falsely recognizes that the attack target machine is infected with the illicit program to execute the read-based instruction.

Figure 5:
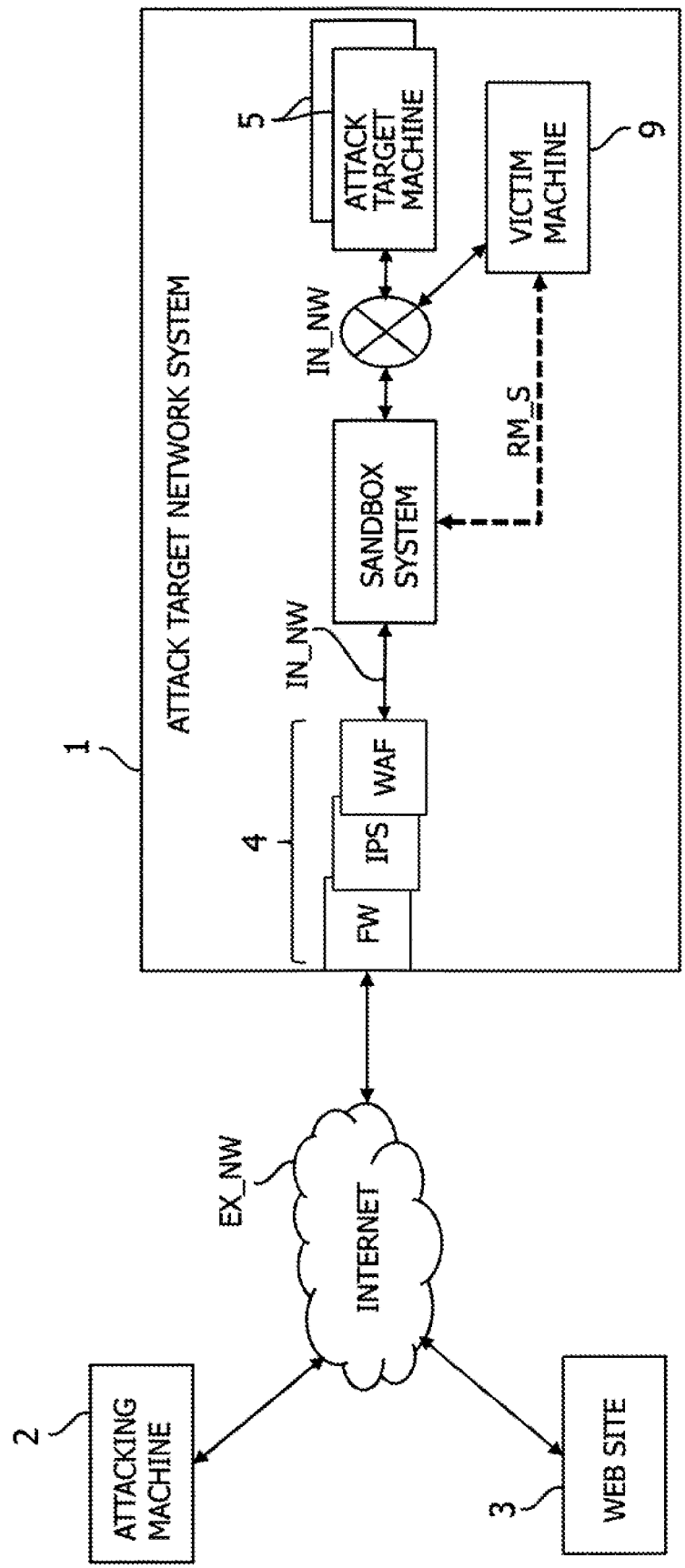
FIG. 5 is a diagram illustrating a configuration example of an attack target network system in the present embodiment.

FIG. 5 is a diagram illustrating a configuration example of an attack target network system in the present embodiment. As is the case with FIG. 3, a sandbox system SB is provided on a path of an internal network IN_NET from security apparatuses 4 to an attack target machine 5 in an attack target network system 1. As is the case with FIG. 3, the sandbox system SB receives substantially all of transmit data transmitted through an external network to the attack target machine and having slipped past the security apparatuses 4, on behalf of the attack target machine. The sandbox system is an isolated computer isolated from the other machines, the servers, and the storages. However, for example, when initiated, the sandbox system SB pre-constructs a remote session RM_S with a victim machine 9.

Figure 6:
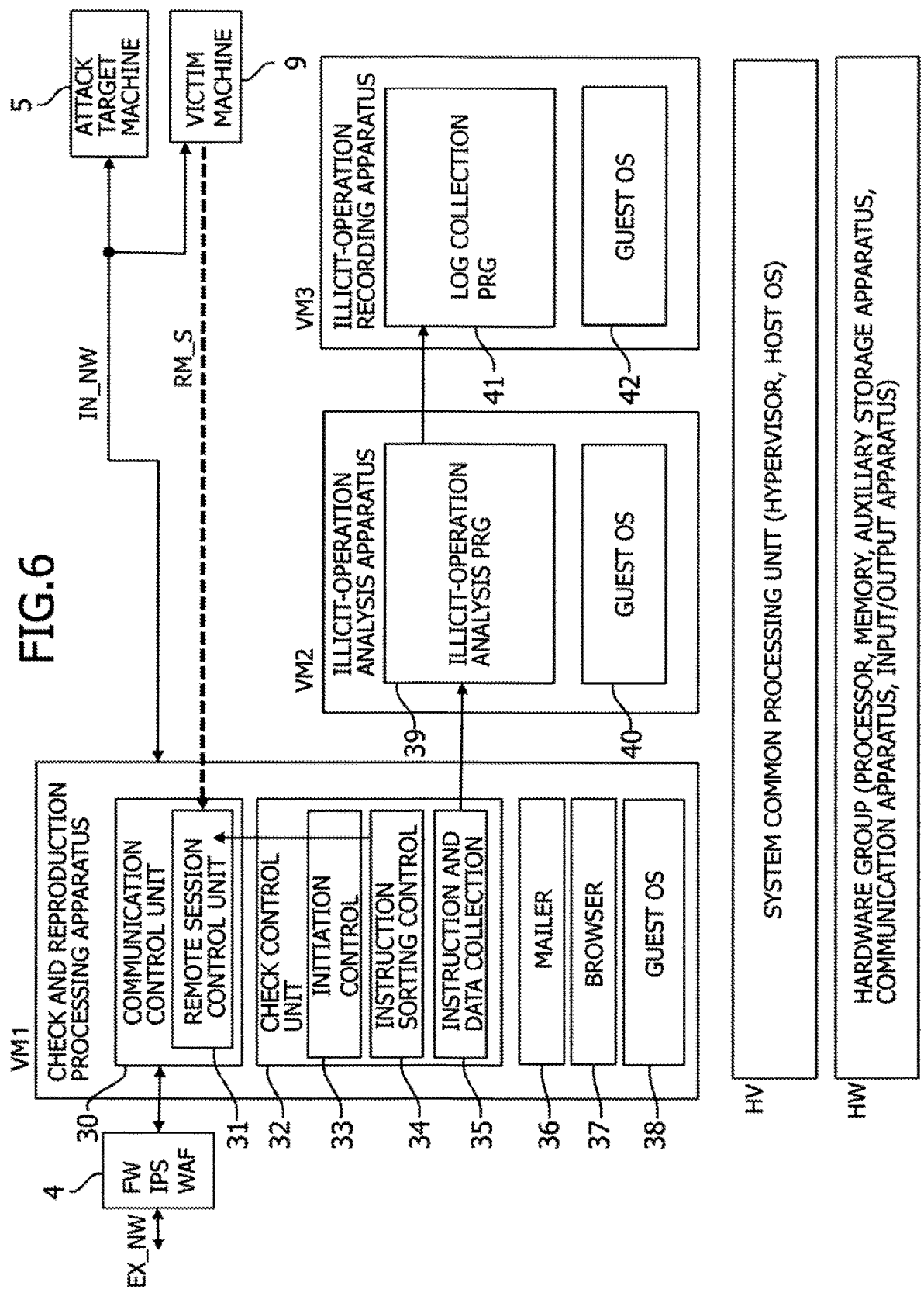
FIG. 6 is a diagram illustrating a configuration example of the sandbox system in the present embodiment.

FIG. 6 is a diagram illustrating a configuration example of the sandbox system in the present embodiment. FIG. 6 specifically illustrates a configuration of a software group in the sandbox system. That is, the sandbox system has a hardware group HW in a computer that is a physical machine and a system common processing unit HV having virtualization software (hypervisor) and host OS that is platform software for the physical machine. The hypervisor generates virtual machines VM1, VM2, VM3 on the physical machine.

A virtual machine has a check and reproduction processing apparatus VM1, an illicit-operation analysis apparatus VM2, and an illicit-operation recording apparatus VM3.

The check and reproduction processing apparatus VM1 is a virtual machine that decodes and initiates for example, an illicit program similarly to the operations of the attack target machine, and that emulates subsequent operations such as execution of instructions. An OS (guest OS) 38, a browser 37, and a mailer 36 that is a mail program are installed in the check and reproduction processing apparatus VM1. Such software is common software similar to the software in the attack target machine.

On the other hand, the check and reproduction processing apparatus VM1 has components described below which are not provided in the attack target machine. First, the check and reproduction processing apparatus has a communication control unit 30 that receives on behalf of the attack target machine 5 packets containing transmit data for a communication session destined for the attack target machine 5 via an external network EX_NET to withhold transfer of the packets to the attack target machine 5. The communication control unit 30 may transfer transmit data that has a high probability of being proper to the attack target machine 5, while withholding transfer transmit data that has a low probability of being proper.

The communication control unit 30 has a remote session control unit 31 that constructs a remote session RM_S between the check and reproduction processing apparatus VM1 and the victim machine 9. The remote session control unit is executed by an initialization routine for initiation of the check and reproduction processing apparatus VM1, which is a virtual machine, and sets up a remote session with the victim machine 9. Alternatively, after the check and reproduction processing apparatus VM1 is started, the remote session control unit is initiated via a human operation to set up a remote session between the remote session control unit 31 and the victim machine 9. The remote session control unit 31 may adopt a scheme similar to a scheme for common remote desktop connection.

The check and reproduction processing apparatus VM1 further has a check control unit 32 that installs, initiates, and executes programs contained in the received transmit data and programs or tools transmitted from the attacking machine 2. The check control unit 32 has an initiation control program 33 that installs and initiates the above-described programs and so on. The check control unit 32 has an instruction sorting or distributing control program 34 that sorts instructions issued in association with execution of the above-described programs and instructions issued through communication sessions with the attacking machine 2 into a group of instructions to be transferred to the victim machine 9 for execution and a group of instructions to be executed by the check and reproduction processing apparatus VM1, and an instruction and data collection program 35 that collects instructions issued or executed by the check and reproduction processing apparatus VM1 and relevant data thereof and that transmits the same to the illicit-operation analysis apparatus VM2.

The above-described communication control unit 30 and check control unit 32 are programs that are installed in the check and reproduction processing apparatus VM1.

The illicit-operation analysis apparatus VM2, which is a second virtual machine, analyzes the instructions executed by the check and reproduction processing apparatus VM1 and the relevant data to perform determination of whether or not the program is illicit, and detection of an illicit attacking machine, and the like. Therefore, a guest OS 40 and an illicit-operation analysis program 39 are installed in the illicit-operation analysis apparatus VM2. The illicit-operation analysis program 39 has anti-virus software that senses a virus pattern in received data, an intrusion detection system (IDS) program, a reputation check program that determines whether or not communication information such as the IP address or URI of received packets or transmitting packets matches any object in a black list, an illicit-operation sensing program that determines whether an operating sequence in the program matches an operating sequence in a typical illicit program.

The illicit-operation recording apparatus VM3, which is a third virtual machine, collects various logs of information collected by the instruction and data collection program 35 in the check and reproduction processing apparatus VM1, the results of analysis by the illicit-operation analysis program 39, and the like. A guest OS 42 and a log collection program 41 are installed in the illicit-operation recording apparatus VM3.

The sandbox system in FIG. 6 includes the three virtual machines VM1, VM2, VM3 generated on the physical machine. Therefore, the physical machine included in the sandbox system is physically isolated from, for example, the attack target machine 5 provided in the internal network IN_NET. Therefore, even though the check and reproduction processing apparatus VM1 emulates execution of the illicit program on behalf of the attack target machine, the attack target machine is prevented from being affected by the emulation.

Figure 7:
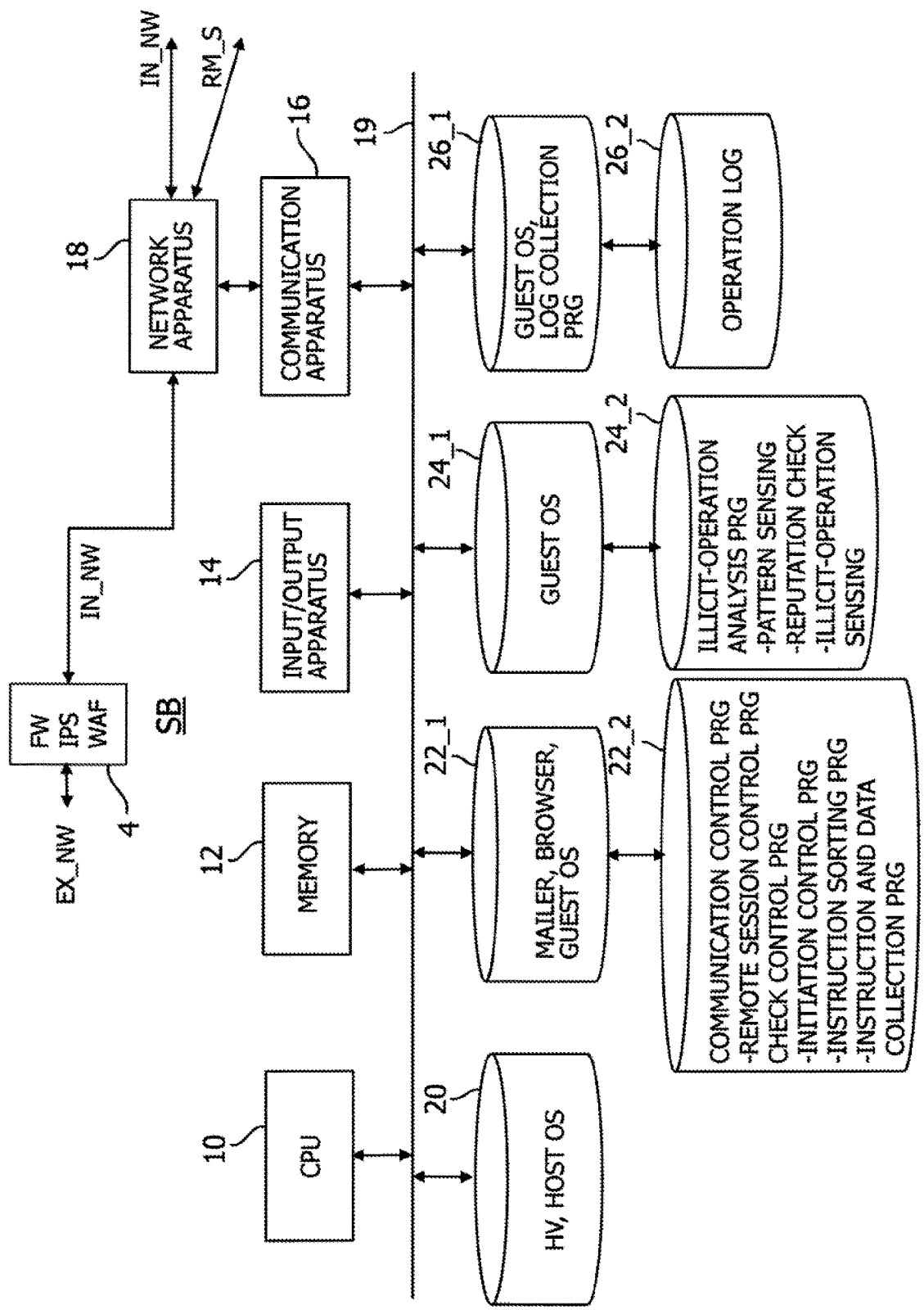
FIG. 7 is a diagram illustrating a physical machine included in the sandbox system.

FIG. 7 is a diagram illustrating a physical machine included in the sandbox system. The physical machine included in the sandbox system SB has a central processing unit (CPU) or a processor 10, a main memory 12, an input/output apparatus 14 such as a keyboard, a mouse and a display, a communication apparatus 16 that exchanges signals between the external network EX_NET and the internal network IN_NET, and a network apparatus 18 such as a virtual network interface or a virtual network switch.

The physical machine further has a bus 19 and a group of auxiliary storage apparatuses 20, 22, 24, 26 such as a hard disk drive (HDD) and a solid state drive (SSD). The group of auxiliary storage apparatuses includes an auxiliary storage apparatus 20 that stores the hypervisor and a host OS, an auxiliary storage apparatus 22_1 that stores the guest OS, browser, and mailer executed by the virtual machine VM1 and an auxiliary storage apparatus 22_2 that stores the communication control program and the check control program, an apparatus 24_1 that stores the guest OS executed by the virtual machine VM2 and an apparatus 24_2 that stores the illicit-operation analysis program, and an apparatus 26_1 that stores the guest OS and log collection program executed by the virtual machine VM3 and an apparatus 26_2 that stores operation logs. The programs in the auxiliary storage apparatuses are expanded in the main memory 12, and the expanded programs are executed by the CPU 10.

The illicit-operation analysis program in the auxiliary storage apparatus 24_2 has a pattern sensing program, a reputation check program, and illicit-operation sensing program. The pattern sensing program is executed by the CPU to sense illicit intrusion based on sensing of a virus pattern or a signature in the received data. The reputation check program is executed by the CPU to, for example, determine whether or not communication information such as the IP address or URI in receive packets received through the external network or transmitting packets output from the victim machine matches any of the IP addresses or URIs of targeted cyber attackers in the black list. The illicit-operation sensing program is executed by the CPU to sense, for example, non-match between an extension of an attached file in the received mail and an activation application that activates the attached file, execution of an instruction to rewrite internal information on the physical machine, and execution of a control instruction.

When the illicit-operation analysis program is executed by the CPU to sense an illicit operation or an illicit program, the communication control program 30 blocks or withholds transferring of the received data to the attack target machine 5. Alternatively, the communication control program 30 may transfer the received data to the attack target machine. Which of the above-described processes is to be executed may depend on the corresponding setting in the communication control program.

The log collection program stored in the auxiliary storage apparatus 26_1 is executed by the CPU to record, during emulation of execution of the program in the received data and execution of relevant instructions, the instructions, the relevant data, the history of a series of communication sessions, and the like in operation logs in the auxiliary storage apparatus 26_2. Then, the operation logs are analyzed to enable reproduction of operations of the illicit program, operations of programs subsequently transmitted from the attacking machine, and operations performed in accordance with the instructions.

Figure 8:
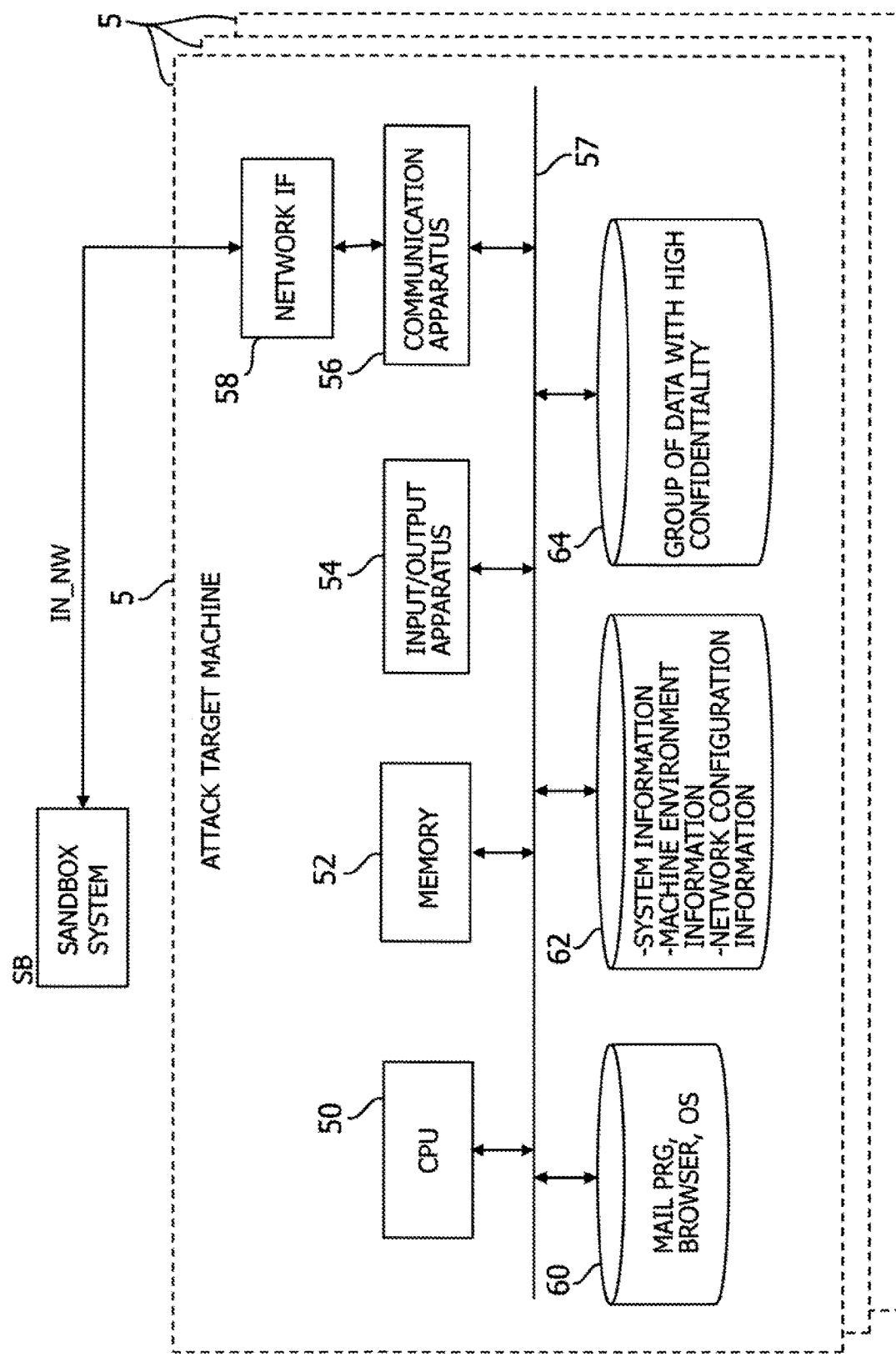
FIG. 8 is a diagram illustrating a configuration example of the attack target machine.

FIG. 8 is a diagram illustrating a configuration example of the attack target machine. The attack target machine 5 is a personal computer or a server computer operated for routine work by a person and having a CPU 50, a main memory 52, an input/output apparatus 54 such as a keyboard or a display, a communication apparatus 56, and a network interface 58 such as a network switch; the CPU 50, the main memory 52, the input/output apparatus 54, the communication apparatus 56, and the network interface 58 are connected together via a bus 57.

The attack target machine has a group of auxiliary storage apparatuses 60, 62, 64. The auxiliary storage apparatus 60 stores the mail program, the browser, and the OS. The auxiliary storage apparatus 62 stores system information, machine environment information, and network configuration information and the like on the attack target machine. The auxiliary storage apparatus 64 may store, for example, a group of very secret data that is confidential information. In that case, a purpose of the attacking machine 2 is to extract or alter confidential information stored in the auxiliary storage apparatus 64 in the attack target machine 5.

The attack target machine may be enabled to access a server in a network segment not depicted in the drawings via the internal network. The server may store the confidential information. In that case, a purpose of the attacking machine is to detect the network segment for the server and a path to the server based on, for instance, the network configuration information on the attack target machine, and to extract and alter the confidential information stored in the server.

Figure 9:
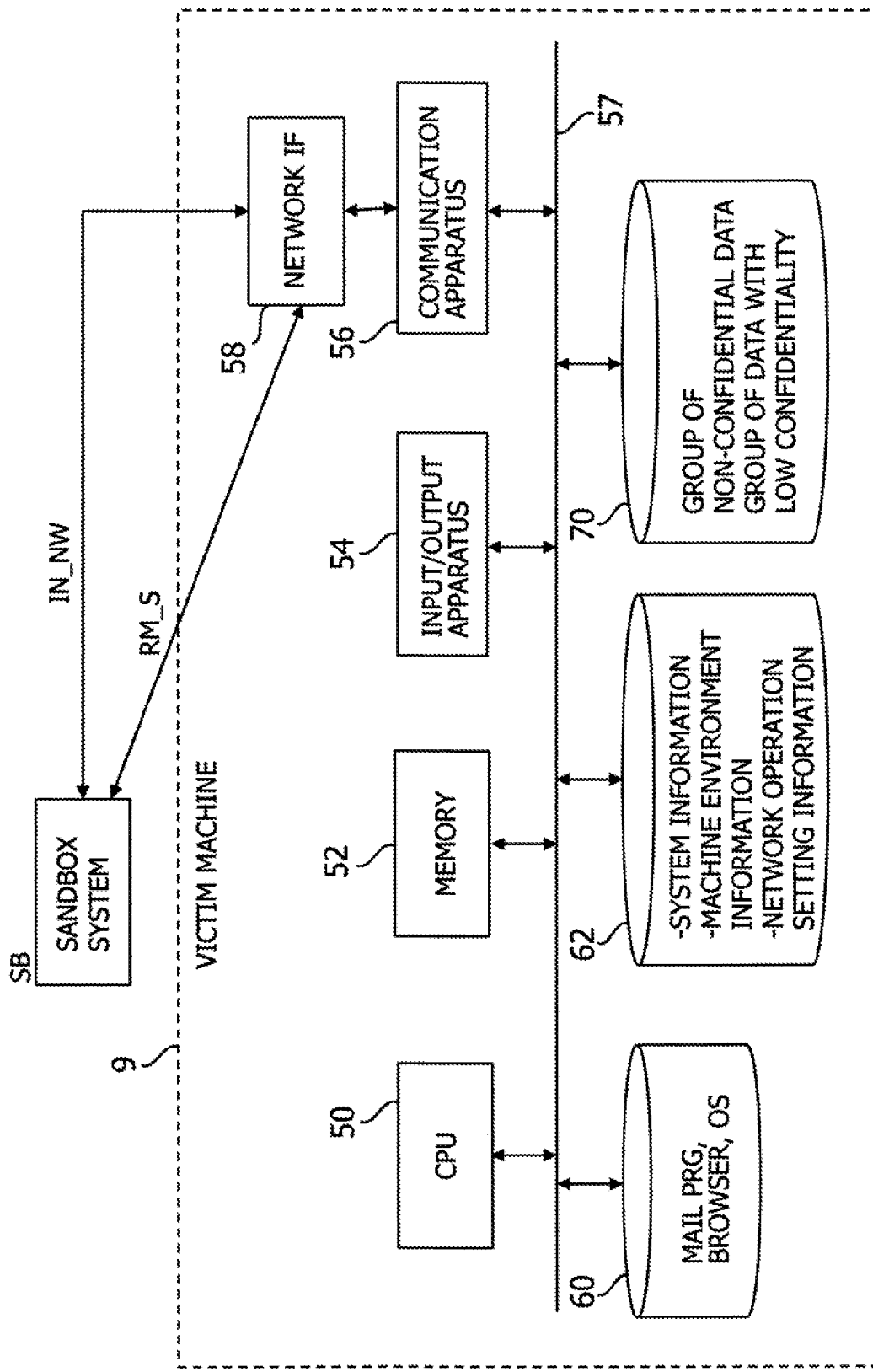
FIG. 9 is a diagram illustrating a configuration example of the victim machine.

FIG. 9 is a diagram illustrating a configuration example of the victim machine. Like the attack target machine 5, the victim machine 9 is a personal computer operated for routine work by a person and having the CPU 50, the main memory 52, the input/output apparatus 54 such as a keyboard or a display, the communication apparatus 56, and the network interface 58 such as a network switch; the CPU 50, the main memory 52, the input/output apparatus 54, the communication apparatus 56, and the network interface 58 are connected together via the bus 57.

The auxiliary storage apparatuses 60, 62 are the same as the auxiliary storage apparatuses 60, 62 in the attack target machine 5 in FIG. 8. However, unlike the auxiliary storage apparatus 64 in the attack target machine 5, an auxiliary storage apparatus 70 stores a group of non-confidential data or a group of data with low confidentiality. Alternatively, for a business reason, the victim machine 9 does not access any server or storage provided on the internal network and in which confidential information is stored. Thus, even with the network configuration information on the victim machine 9 collected, collection of information needed to access the server or the storage is difficult. Therefore, even when the attacker forces the victim machine 9 to execute the read-based instruction, there is no or little risk of extraction, from the auxiliary storage apparatus of the victim machine, of confidential information or information on the network to which the server or storage storing the confidential information is connected.

Figure 10:
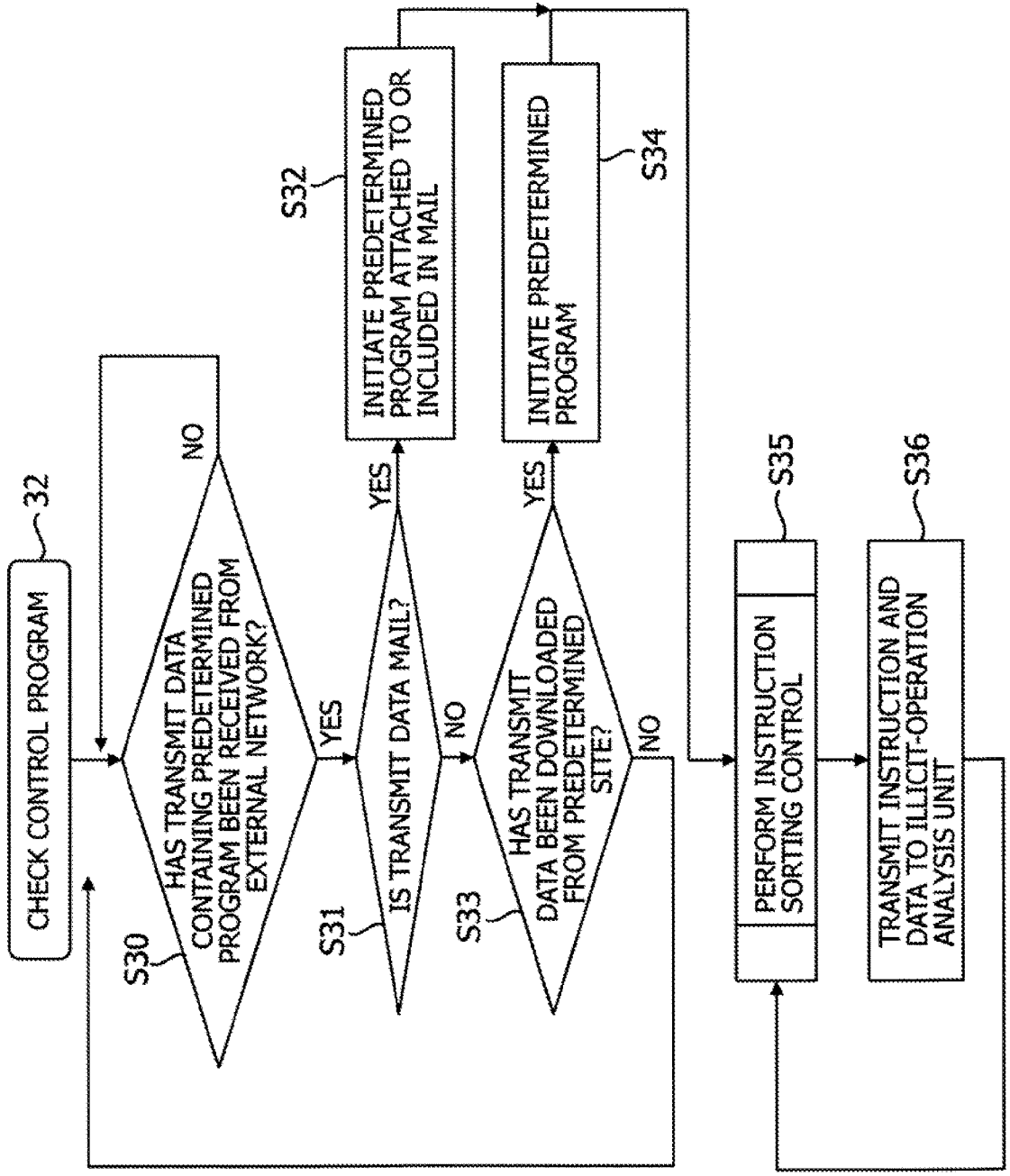
FIG. 10 is a flowchart of processing of the check control program executed by the check and reproduction processing apparatus VM1 in the sandbox system.

FIG. 10 is a flowchart of processing of the check control program executed by the check and reproduction processing apparatus VM1 in the sandbox system. As described in FIG. 6, the check control program 32 has the initiation control program 33, the instruction sorting control program 34, and the instruction and data collection program 35 in order to execute on behalf of the attack target machine the programs, instructions, commands, and the like contained in the received data transmitted through the external network.

The check control program 32 is executed by the CPU 10. When the communication control unit 30 receives transmit data including a predetermined program through the external network (S30, YES), if the transmit data is a mail (S31, YES), the check control program 32 initiates the predetermined program attached to or included in the mail. This processing is equivalent to the user 6 opening the mail and executing the file attached to or included in the mail when the attack target machine 5 receives the mail.

If the transmit data is data downloaded from a predetermined site (S33, YES), the predetermined program included in the downloaded received data is initiated (S34). This processing is equivalent to initiation of the program included in the data received from the predetermined site by the attack target machine 5 by means of drive-by download.

Unlike the attack target machine, the sandbox system is normally not operated by a person, and thus, the initiation control program 33 in the check control program automatically executes steps S31 to S34 described above.

The check control program 32 is executed by the CPU 10 to perform sorting processing in which, after execution of the predetermined program, instructions or commands issued by the execution of the program or instructions or commands transmitted from the attacking machine 2 are sorted into a group of instructions or commands transferred to the victim machine 9 via the pre-constructed remote session and a group of instructions or commands that are to be executed by the guest OS 38 in the check and reproduction processing apparatus VM1 (S35). This processing is performed by the CPU executing the instruction sorting control program 34. The check control program transmits an instruction to be sorted and relevant data to the illicit-operation analysis apparatus VM2 (S36). The processing of transmitting an instruction and data is performed by the CPU executing the instruction and data collection program 35.

Figure 11:
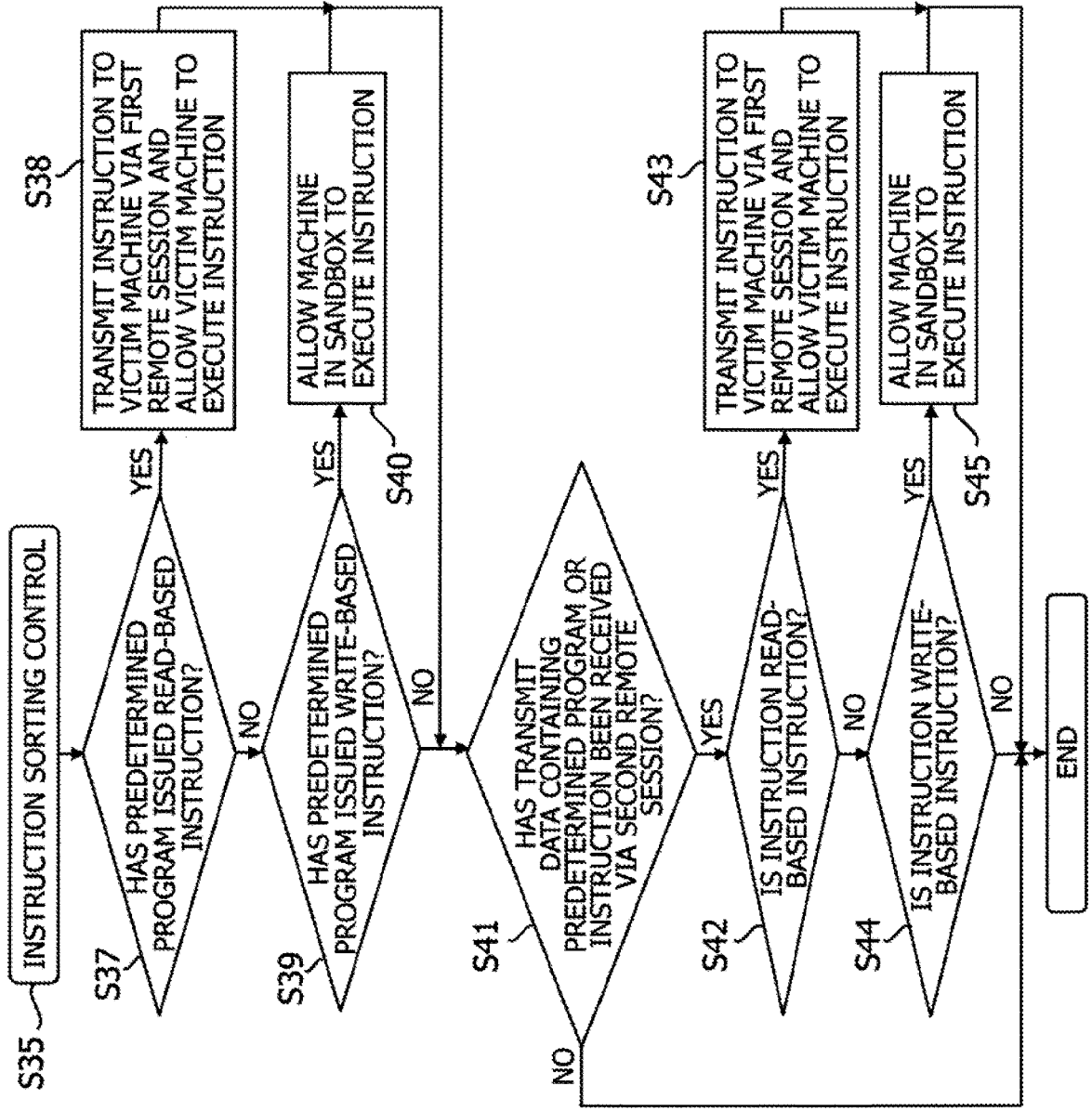
FIG. 11 is a flowchart illustrating processing of the instruction sorting control program.

FIG. 11 is a flowchart illustrating processing of the instruction sorting control program. The instruction sorting control program is executed by the CPU. When the predetermined program initiated by the initiation control issues a read-based instruction to the attack target machine or a resource (for example, the server or the storage) on the internal network accessible by the attack target machine (S37, YES), the instruction sorting control program transmits the instruction to the victim machine 9 via a first remote session RM_S to allow the victim machine 9 to execute the instruction (S38).

Examples of the read-based instruction include commands to reference registry information, machine environment information, network configuration information, and like on the machine, for example, sysinfo (a command to acquire the system information and the usage of memory), reg query (a command to display setting information in the registry), ipconfig (a command to reference the private IP address of the machine or the like in a router or in the network), netstat (a command to acquire a network connection status of the machine and network statistics on the machine; the command acquires a list of connections provided by the machine, a routing table, and the like). Alternatively, a particular key operation for acquiring a snap shot of the desktop of the machine belongs to the read-based instruction.

When the initiated predetermined program issues a write-based instruction to the attack target machine or the above-described resource on the internal network (S39), the instruction sorting control program allows the machine in the sandbox system to execute the instruction (S40).

Examples of the write-based instruction include an instruction to update a file held by the attack target machine, an instruction to place a file in a particular directory, and an instruction to execute an executable file. The write-based instruction may be executed, for example, by the guest OS in the check and reproduction processing apparatus VM1.

The instruction sorting control program is executed by the CPU. When the illicit program receives transmit data including a predetermined program or an instruction via a second remote session constructed between the sandbox system and the attacking machine 2 (S41, YES), if the predetermined program or the instruction is a read-based instruction (S42, YES), the instruction sorting control program transmits the instruction or the like to the victim machine 9 via the first remote session RM_S and allows the victim machine 9 to execute the instruction (S43). Examples of the read-based instruction are as described above.

When the predetermined program or the instruction is a write-based instruction (S44, YES), the instruction or the like is executed by the machine in the sandbox (S45).

Figure 12:
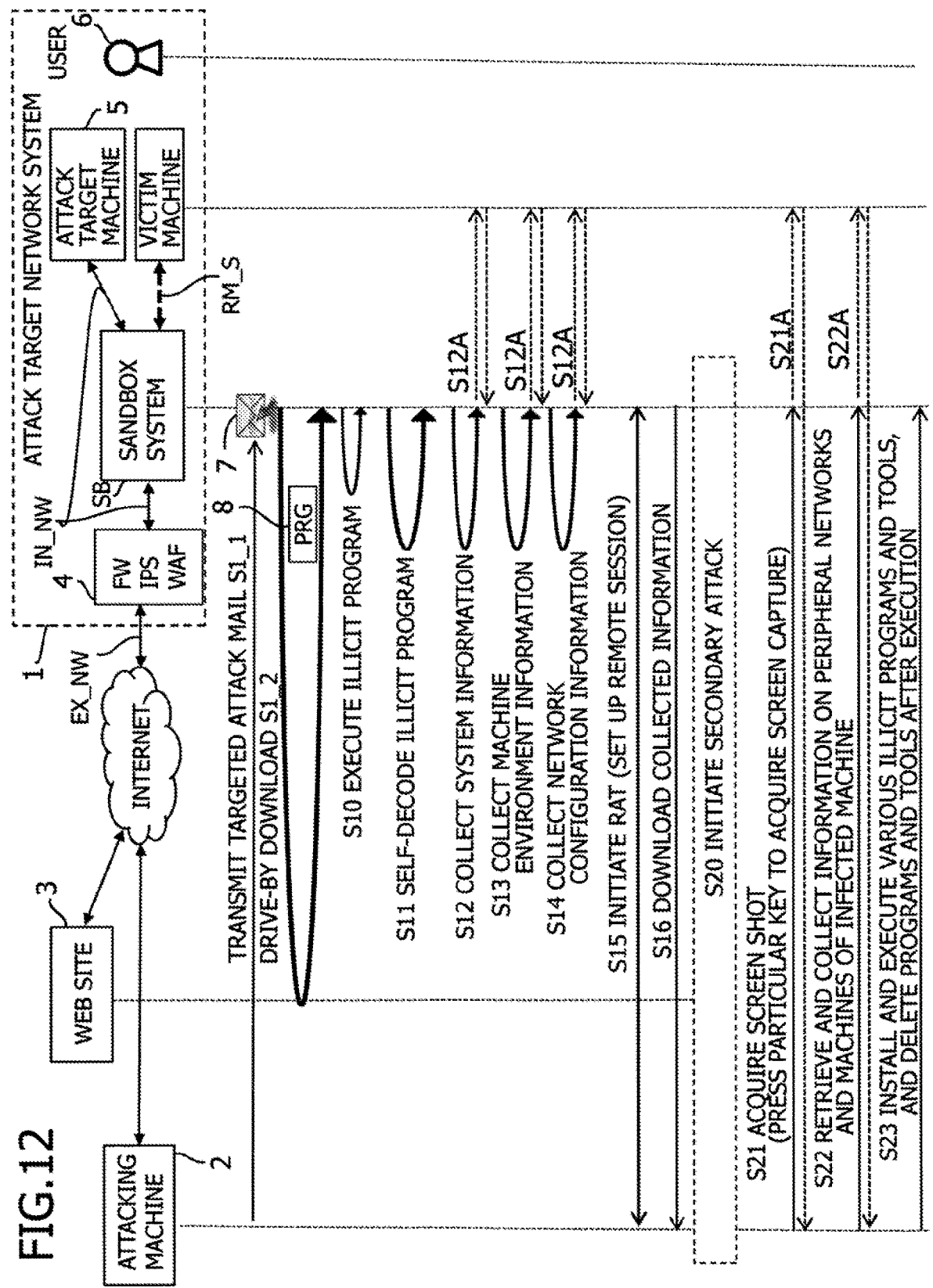
FIG. 12 is a diagram illustrating an operation example of the sandbox system in the present embodiment.

FIG. 12 is a diagram illustrating an operation example of the sandbox system in the present embodiment. FIG. 12 illustrates how the sandbox system processes the operations of the illicit program included in the received mail or data or the programs, instructions, commands, or the like transmitted through the remote session by the attacking machine 2, which are similar to those described for FIGS. 2 and 4.

First, when the sandbox system receives a received mail including a targeted attack mail (S1_1) or receives received data through drive-by download (S1_2) by the attack target machine 5, the check and reproduction processing apparatus VM1 in the sandbox system acquires the received mail or the received data and initiates and executes the predetermined program attached to or included in the received mail 7 or the predetermined program 8 contained in the received data without any intervention of human operation (S10). The predetermined program first executes self-decoding (S11). An instruction to decode a compressed file for the predetermined program is a write-based instruction to write a decompressed file to a predetermined storage area. Thus, the instruction is assigned to and executed by the check and reproduction processing apparatus VM1 in the sandbox. This prevents the predetermined program from being decoded in the attack target machine.

Then, the predetermined program issues an instruction to collect system information (S12), an instruction to collect machine environment information (S13), and an instruction to collect network configuration information (S14). These instructions are read-based instructions to reference environment information. Thus, the instruction sorting control program transfers the instructions to the victim machine 9 via the remote session RM_S (S12A, S13A, S14A). The transferred instructions are executed by the victim machine 9, which then stores read information in a predetermined storage area in the check and reproduction processing apparatus VM1 in the sandbox system.

The operation of transferring the read-based instruction to the victim machine for execution is different from the operation of the sandbox in FIG. 4.

The information collection instructions S12, S13 are executed by the victim machine and thus allow information on the victim machine to be collected. Therefore, the information on the victim machine includes no virtualization program (hypervisor) in contrast to the machine information on the check and reproduction processing apparatus VM1 in the sandbox system. Alternatively, the network configuration information on the victim machine includes information on the network segment to which the server in the internal network is connected and routing information on the network segment. Such information is generally not included in the network configuration information on the sandbox system. As a result, there is only a low probability that the attacker suspects the presence of a sandbox system based on the collected information on the victim machine.

Then, the predetermined program initiates the remote administration tool RAT to construct a second remote session between the sandbox system and the attacking machine 2 (S15). The instruction to allow the RAT to set up a remote session is a process initiation instruction and belongs to the write-based instruction because the instruction involves write of setting information on the constructed remote session. Therefore, the instruction is executed in the check and reproduction processing apparatus VM1 according to the instruction sorting control program.

The predetermined program downloads the information collected in steps S12, S13, S14 to the attacking machine 2 via the remote session constructed between the sandbox system and the attacking machine (S16). The downloaded collected information is not the information on the virtual machine VM1 in the sandbox system but the information on the victim machine 9 connected to the internal network and operated for routine work by a person. Therefore, the attacker is unlikely to sense that the illicit program has been executed in the sandbox system based on the collected information.

The attacking machine subsequently starts a secondary attack (S20). For example, an instruction to acquire a screen shot of the screen is transmitted from the attacking machine 2 via the remote session (S21). The acquisition instruction can substantially be transmitted, for example, by performing a keyboard operation of acquiring a screen shot by carrying out a remote operation on the victim machine utilizing the remote session from the attacking machine 2. Alternatively, the acquisition instruction can also be transmitted by transmitting an acquisition command from the attacking machine 2 via the remote session so as to have the machine having received the command execute the same.

Since the acquisition command corresponding to the remote operation or the transmitted acquisition command is to acquire a desktop screen and is thus a read-based instruction, the instruction sorting control program 34 transmits the command to the victim machine 9 via the remote session RM_S and allows the victim machine 9 to perform the acquisition (S21A). The acquired screen shot image is, for example, stored in a storage area in the check and reproduction processing apparatus VM1 in the sandbox system.

When the attacking machine 2 transmits an instruction to retrieve and collect information peripheral networks and peripheral machines of the machine infected with the illicit program (in this case, the check and reproduction processing apparatus VM1) (S22), the instruction sorting control program 34 transmits the instruction to the victim machine 9 via the remote session RM_S and allows the victim machine 9 to perform the acquisition (S22A) because the retrieval and collection instruction is a read-based instruction. The collected information is, for example, stored in the storage area in the check and reproduction processing apparatus VM1 in the sandbox system.

As described above, when an instruction to further collect information is transmitted via the remote session with the attacking machine, the instruction sorting control program in the check and reproduction processing apparatus VM1 transmits the instruction to the victim machine 9 for execution. Thus, even when the attacking machine analyzes the collected information, in other words, the information on the victim machine and peripheries thereof, there is only a low probability that the attacking machine notices the presence of the sandbox system.

When the attacking machine 2 transmits an instruction to install an illicit program or an illicit tool or to delete the illicit program or the illicit tool (S23), the check and reproduction processing apparatus VM1 in the sandbox system executes the instruction as such an instruction is a write-based instruction to a machine infected with an illicit program. Consequently, the illicit program and the illicit tool can be prevented from being installed in the victim machine 9.

[Sandbox System in the Second Embodiment]

The sandbox system in the first embodiment illustrated in FIG. 5 is an example of a gateway type provided on the path of the internal network IN_NET between the external network EX_NET and the attack target machine 5. In contrast, a sandbox system in a second embodiment is an example of an end point type including a virtual machine generated in the physical machine of the attack target machine 5.

Figure 13:
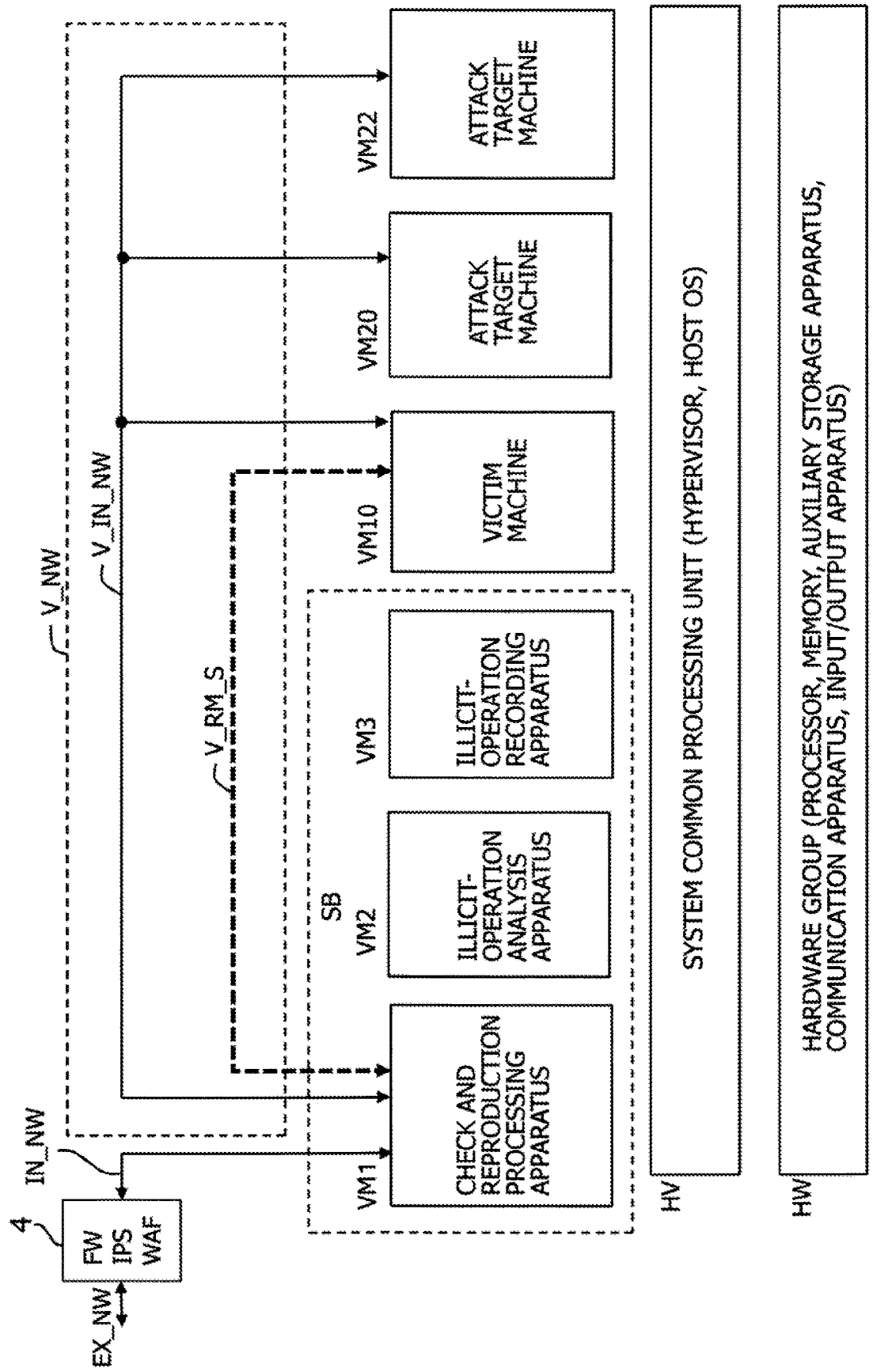
FIG. 13 is a diagram of a configuration of the sandbox system in the second embodiment.

FIG. 13 is a diagram of a configuration of the sandbox system in the second embodiment. In the example in FIG. 12, in addition to attack target machines VM20, VM22 and a victim machine VM10, three virtual machines VM1, VM2, VM3 providing a sandbox system SB are generated on a hardware group HW including common physical machines and a system common processing unit HV including platform programs for a hypervisor and a host OS.

As is the case with FIG. 6, the sandbox system SB has a check and reproduction processing apparatus VM1, an illicit-operation analysis apparatus VM2, and an illicit-operation recording apparatus VM3. Configurations of these apparatuses are similar to the configurations in FIG. 6. Configurations of the attack target machines VM20, VM22 and the victim machine VM10 are similar to the corresponding configurations in FIGS. 8 and 9.

In the example in FIG. 13, a virtual network V_NW is set to construct connection between an internal network IN_NET connected security apparatuses 4 and the check and reproduction processing apparatus VM1, a virtual internal network V_IN_NET between the check and reproduction processing apparatus VM1 and the attack target machines VM20, VM22 and between the check and reproduction processing apparatus VM1 and the victim machine VM10, and a virtual remote session V_RM_S between the check and reproduction processing apparatus VM1 and the victim machine VM10.

The virtual network V_NW allows the sandbox system SB to acquire received data from the external network and to withhold transfer of the data to the attack target machines as is the case with the gateway type.

In this configuration with the sandbox system SB, the attack target machines, and the victim machine, the sandbox system emulates execution of an illicit program on behalf of the attack target machines as is the case with the first embodiment. As in the case of the first embodiment, an instruction to collect information issued by the illicit program is executed by the victim machine, and machine and setting information on the victim machine is collected instead of machine and setting information on the sandbox system infected with the illicit program. This enables a reduction in the probability that the attacker suspends the presence of the sandbox system, allowing the attacking method of the attacker to be captured.

In FIG. 13, each attack target machine and the victim machine may include different physical machines.

[Sandbox System in the Third Embodiment]

Figure 14:
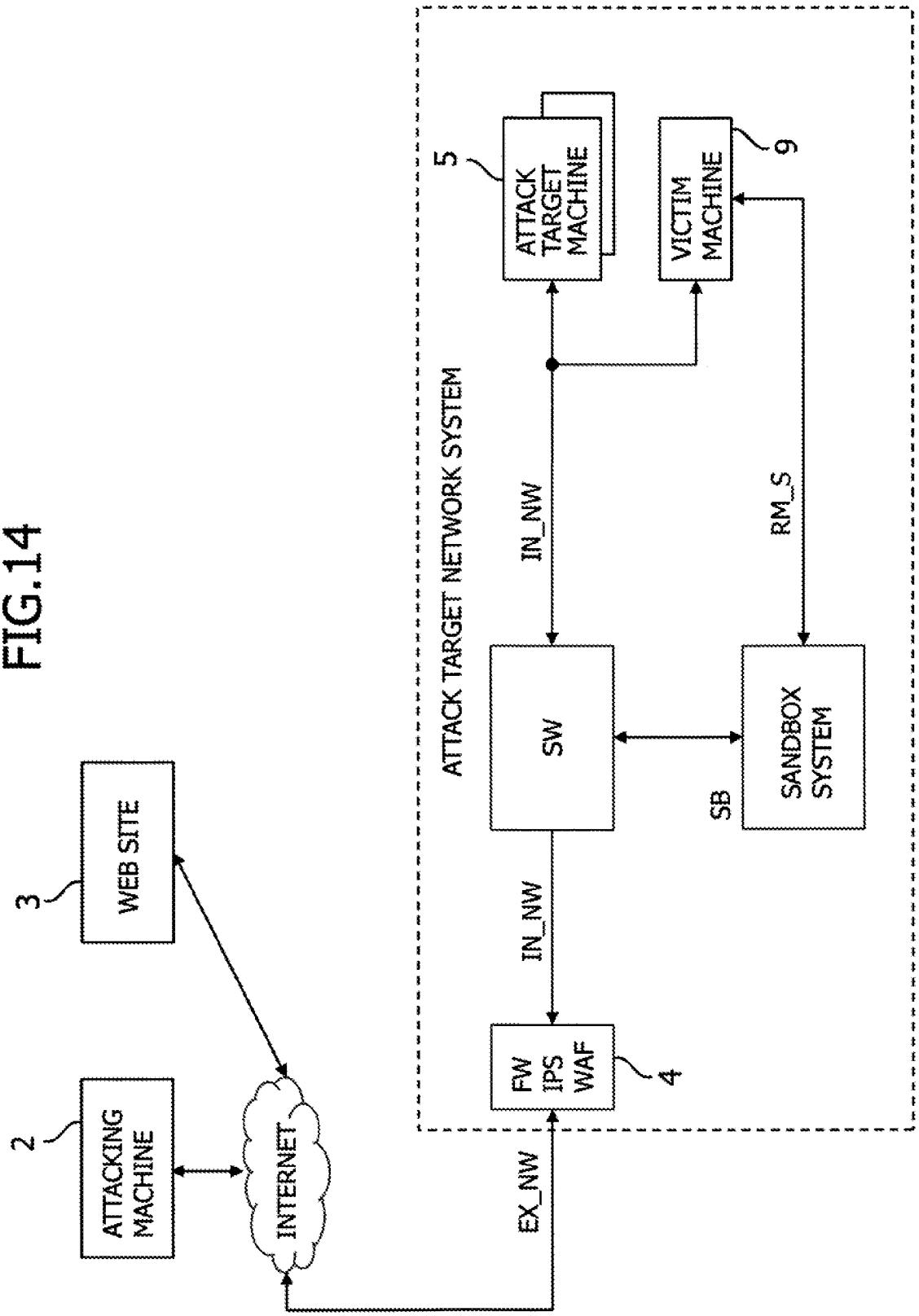
FIG. 14 is a diagram illustrating a configuration of a sandbox system and an attack target network system in a third embodiment.

FIG. 14 is a diagram illustrating a configuration of a sandbox system and an attack target network system in a third embodiment. The sandbox system SB is connected to a branch port of a switch SW provided on a path of an internal network IN_NW located close to an external network EX_NET. An attack target machine 5 and a victim machine 9 can communicate with each other through the external network EX_NW via the switch SW. The switch SW is, for example, a physical switch. Received data transmitted through the external network and passed through security apparatuses 4 is transmitted to the attack target machine 5 and the victim machine 9 and also intercepted by the sandbox system SB.

In the third embodiment, a configuration of the sandbox system SB is the same as the corresponding configuration in FIG. 6 except for connections to the internal network IN_NW. Therefore, the sandbox system SB receives a received mail or a drive-by-downloaded illicit program and automatically initiates and executes the illicit program. While emulating execution of the illicit program, the sandbox system SB transmits read-based instructions from the attacker to the victim machine 9 via a remote session RM_S for execution, and executes write-based instructions independently.

As described above, in the first, second, and third embodiments, when the sandbox is installed in order to protect from possible targeted cyber attack by sensing the illicit program and capturing the attacking method, the probability that the attacker senses the presence of the sandbox is reduced. Consequently, various attacking methods of attackers can be captured as many as possible.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein an attack content analysis program that causes a computer to execute a process comprising:
   receiving transmit data including a first program and transmitted, through a second network, to a first machine connected to a first network, the first machine being an attack target machine, and the first network being able to be accessed through the second network;
   transmitting, after initiation of the first program, a read-based instruction of the first program for reading a predetermined information relating to the first machine to a second machine, which is different from the first machine, via a first session established between the computer and the second machine, and causing the second machine to execute the read-based instruction and read the predetermined information; and
   executing, after initiation of the first program, a write-based instruction for the first machine of the first program on behalf of the first machine.

2. The non-transitory computer-readable storage medium according to claim 1, wherein the process further comprises collecting logs of the read-based instruction and the write-based instruction.

3. The non-transitory computer-readable storage medium according to claim 1, wherein the write-based instruction includes one or both of an instruction to install the first program in the first machine and an instruction to install a second program in the first machine after initiation of the first program.

4. The non-transitory computer-readable storage medium according to claim 1, wherein the read-based instruction includes a command to query for machine information or setting information on the first machine, the predetermined information relating to the first machine including the machine information or setting information on the first machine.

5. The non-transitory computer-readable storage medium according to claim 4, wherein the process further comprises:
   storing the machine information or setting information which has been read in the second machine by execution of the read-based instruction in the second machine; and
   executing an instruction to establish a second session with a third machine on the second network.

6. The non-transitory computer-readable storage medium according to claim 5, wherein the process further comprises:
   executing, after executing the instruction to establish the second session, an instruction to install a second program in the first machine.

7. The non-transitory computer-readable storage medium according to claim 6, wherein the process further comprises transmitting an instruction to acquire a screen capture image to the second machine via the first session and causing the second machine to execute the instruction to acquire the screen capture image.

8. The non-transitory computer-readable storage medium according to claim 1, wherein the computer is isolated from the first machine.

9. The non-transitory computer-readable storage medium according to claim 1, wherein the process further comprises:
   initiating the received first program on behalf of the first machine in response to reception of the transmit data.

10. A method of analyzing an attack content, the method comprising:
    receiving transmit data including a first program and transmitted, through a second network, to a first machine connected to a first network, the first machine being an attack target machine, and the first network being able to be accessed through the second network;
    transmitting, after initiation of the first program, a read-based instruction of the first program for reading a predetermined information relating to the first machine to a second machine, which is different from the first machine, via a first session established between a computer and the second machine, and causing the second machine to execute the read-based instruction and read the predetermined information; and
    executing, after initiation of the first program, a write-based instruction for the first machine of the first program on behalf of the first machine.

11. The method of analyzing an attack content according to claim 10, further comprising:
    collecting logs of the read-based instruction and the write-based instruction.

12. An attack content analysis apparatus comprising:
    a memory; and
    a processor which accesses the memory, wherein the processor executes a process including,
      receiving transmit data including a first program and transmitted, through a second network, to a first machine connected to a first network, the first machine being an attack target machine, and the first network being able to be accessed through the second network;
      transmitting, after initiation of the first program, a read-based instruction of the first program for reading a predetermined information relating to the first machine to a second machine, which is different from the first machine, via a first session established between a computer and the second machine, and causing the second machine to execute the read-based instruction and read the predetermined information; and
      executing, after initiation of the first program, a write-based instruction for the first machine of the first program on behalf of the first machine.

13. The attack content analysis apparatus according to claim 12, further comprising:
    collecting logs of the read-based instruction and the write-based instruction.

* * * * *